United States Patent [19]

Caprette, Jr. et al.

[11] Patent Number: 4,820,753

[45] Date of Patent: Apr. 11, 1989

[54] ACOUSTIC WINDOW AND MATERIAL THEREFOR

[75] Inventors: Samuel J. Caprette, Jr., Chagrin Falls; Wilson N. Smith, Jr., Cuyahoga Falls, both of Ohio

[73] Assignee: The B. F. Goodrich Company, Akron, Ohio

[21] Appl. No.: 168,211

[22] Filed: Mar. 15, 1988

[51] Int. Cl.$^4$ .......................... C08K 3/04; C08L 1/08; C08L 7/00
[52] U.S. Cl. ....................... 524/41; 524/424; 524/496; 524/503; 524/506; 524/507; 524/511; 524/513; 524/514; 524/517; 524/525; 524/526; 524/588; 524/589; 524/593; 524/594; 524/600; 524/606; 525/57; 525/58; 525/101; 525/123; 525/125; 525/126; 525/133; 525/134; 525/175; 525/176; 525/179; 525/180; 525/423; 525/424; 525/425; 525/426; 525/437; 525/440; 525/477; 525/479
[58] Field of Search .............. 524/41, 424, 496, 503, 524/506–507, 511, 513–514, 517, 525–526, 588–589, 600, 606, 593–594; 525/57–58, 101, 123, 125–126, 133–134, 175–176, 179–180, 423–426, 437, 440, 477, 479

[56] References Cited

U.S. PATENT DOCUMENTS

| | | |
|---|---|---|
| 2,811,216 | 10/1957 | Harris . |
| 3,969,568 | 7/1976 | Sperley . |
| 3,991,027 | 11/1976 | Gils et al. ................ 525/133 |
| 4,244,847 | 1/1981 | Posiviata et al. .......... 524/606 |
| 4,387,178 | 6/1983 | Tracy et al. ............... 524/514 |
| 4,469,748 | 9/1984 | Sharma .................... 525/133 |
| 4,492,779 | 1/1985 | Junior et al. .............. 524/514 |
| 4,514,541 | 4/1985 | Frances .................... 524/514 |
| 4,532,275 | 7/1985 | Shimada ................... 525/423 |
| 4,588,780 | 5/1986 | Edwards et al. ........... 524/514 |
| 4,643,938 | 2/1987 | Oyama et al. ............. 428/462 |
| 4,699,832 | 10/1987 | Sattelmeyer .............. 525/133 |
| 4,703,086 | 10/1987 | Yamamoto et al. ........ 525/133 |

FOREIGN PATENT DOCUMENTS 166419 7/1953 Australia .

*Primary Examiner*—Herbert J. Lilling
*Attorney, Agent, or Firm*—David M. Ronyak; Woodrow W. Ban

[57] ABSTRACT

A sonic window suitable for use in sonar applications wherein an elastomer such as natural or synthetic natural rubbers, a low air entrapping fiber or fibril used for reinforcement, fillers, and thermosetting resins are formed into desired window configuration. The low air entrapment associated with the fiber or fibrils produces a remarkably sonicly transparent window.

19 Claims, 1 Drawing Sheet

ACOUSTIC WINDOW AND MATERIAL THEREFOR

FIELD OF THE INVENTION

This invention relates to acoustic devices for use in a hydraulic environment and to materials for forming portions of such acoustic devices. More specifically, this invention relates to sonar domes and sonar windows and to materials for forming such sonar domes or windows. Particularly, this invention relates to sonar windows formed from an elastomer having fiber reinforcement therein and to materials useful in the manufacture of such sonar windows.

BACKGROUND OF THE INVENTION

Acoustic windows for use in transmitting or receiving acoustic wave form signals in a liquid environment are known. Traditionally these windows have consisted of a single thickness of a metal such as steel that may optionally have been covered by a rubber containing therein a biologically active substance such as a biocide. These biocide containing rubbers tend to inhibit a build-up of marine life on the surfaces of the window as such build-ups can prove disfunctional to the transmission or reception of acoustic waveforms as well as contributing to disfunctional hydraulic disturbances during propagation through the marine environment of a vessel or other object which might embody such a window.

Typically such windows on an exterior surface have interfaced with a body of free liquid such as an ocean, lake or tank. Such windows, on the interior surface, traditionally have at least partially defined a chamber filled with water or with another liquid. Substantial efforts have been expended to configure such windows to be acoustically "clear", that is producing a desirably low distortion and attenuation of sound wave energy as the sound wave energy is passed through the window, and equally, a desirably low distortion of the angle characterizing the impingement of the sound wave energy against the window.

Such windows have been subject to certain undesirable characteristics. For example, windows made of a rigid material such as steel can generate significant quantities acoustic noise associated with the passage of water over the window and can transmit significant quantities of acoustic noise arising from vibrational frequencies associated with the operation of machinery aboard an object or vessel upon which the window is embodied. Additionally, relatively rigid windows can generate a significant bounce or reflective effect for acoustic waveform energy impinging upon the window surface. Such bounce or reflection can result in a substantial reduction in intensity for signals being transmitted through the window. Where reflection occurs from interior surfaces of the window during transmission of an acoustic waveform from within the chamber defined by the window, spurious or erroneous determinations of the existence or position of an echo could result.

Windows such as sonar domes can be required to transmit acoustic energy having a frequency ranging from about 500 Hz to about 500 kHz. These frequencies correspond to wavelengths of about 3 meters to about 0.003 meters in sea water, with the wavelengths being subject to some variation depending upon the liquid material through which the waveform is being propagated. With traditional domes of metal, or those known in the art of reinforced plastic, where the thickness of the material from which the dome is fabricated deviates substantially from one half wavelength of the acoustical frequency being transmitted through the dome, reduction such as through insertion loss, that is 20 log($P_O/P_T$), where $P_O$ is the incident pressure of the wave and $P_T$ is the transmitted pressure, can become unacceptable.

A sonar dome or a sonar window must be built to withstand structurally a particular loading. This construction results in an inherently necessary thickness in the material of construction, where rigid materials are employed. Where this thickness substantially deviates from one half the wavelength being transmitted, an effective blindness to certain acoustic frequencies can result by simple reduction of the waveform energy transmitted across the material thickness.

Relatively small windows or sonar domes have been formed frequently of unreinforced rubbers. Such rubbers are remarkably transparent to the transmission of acoustic frequencies in desired wavelength ranges. These windows formed of unreinforced rubbers, however, are susceptible to deformation from hydrostatic and hydrodynamic forces imposed upon the window by the environment in which it is operated. For example, motion of a submarine embodying such a window through the ocean waters can impose hydrodynamic forces upon a window sufficient to deform the window, possibly even into contact with the sonar array positioned therebeneath. Conversely, simple changes in hydrostatic pressure imposed upon the window by reason of a changing operating depth for a submersible embodying a window can impose hydrostatic forces producing similar distortion effects to the window. This distortion phenomenon is associated principally with a relatively low modulus associated with unreinforced rubber.

Various proposals have been made for reinforcing sonar windows made of rubbers. Conventional techniques such as the introduction of a fabric or cord reinforcement into the rubber have met with somewhat limited success. One drawback to the use of fabric or cording reinforcement has been the inherent inclusion of air in the fabric or cording at the time of incorporation into the rubber for reinforcement purposes. This included air is not readily eliminated and becomes trapped in the resulting window. This included air operates as a substantial barrier or reflector to many sonic frequencies, and impairs materially the functionality of any resulting sonar window or dome.

More recently, sonar windows made employing cis-polybutadiene and including a reinforcement of polyvinyl alcohol fibers therein has found application in making sonar windows having acoustic clarity and utility in a range of 200 kHz to 500 kHz. Cis-polybutadiene is a somewhat difficult elastomer with which to work in forming such windows, however, and is relatively expensive. These windows also have not found significant application in a range of desired sonar frequencies of between about 10 kHz and 100 kHz.

Accordingly, a sonar window having utility in a frequency range of between about 10 kHz and about 100 kHz in an aqueous environment, displaying essentially the sonic transparency of unreinforced rubber, and providing a desirable flexural modulus of between 2,000 and 40,000 psi (13,790–275,800 kPa) could find substantial utility in the manufacture of sonic windows.

SUMMARY OF THE INVENTION

The present invention provides a sheet-like acoustic window comprising an elastomer and a fibre reinforcement. The elastomer is selected from a group consisting of natural, synthetic natural, chlorinated, and silicon rubbers; acrylonitrile-butadiene copolymer; styrene-butadiene copolymer; polyurethanes; and mixtures thereof and further may include a filler and a resin of either thermosetting or non-thermosetting type. The fibre reinforcement is selected from chopped fiber or fibrils of a material belonging to a group including steel, polyester, polyamide, polyaramid, polyimide, rayon, polyvinyl alcohols, and nylon and imparting to the acoustic window entrapped air not in excess of 0.10% of the volume of the sheet-like acoustic window. Preferably the extent of air entrapment does not exceed 0.05% and most preferably 0.010% of the volume of the sheet-like acoustic window.

The fibre reinforcement, the elastomer, any filler and any resin are substantially uniformly and blendedly present in a desired and effective proportion. The sheet-like acoustic window formed therefrom is formed and cured to possess desired physical dimensions and is of a configuration providing effective strength when employed as a sonic window.

Typically any filler is present as a particulate. The particulate filler is typically present in a quantity of not less than about 0.0% nor no more than about 50% by weight of the sheet-like acoustic window. Most typically the filler is a particulate carbonaceous material.

The resin employed in the sheet-like acoustic window of the invention is selected from a group consisting of both thermosetting or non-thermostting resins such as phenol formaldehyde, resorcinol formaldehyde, coumarone indene actyl phenol formaldehydes and mixtures thereof and typically is present in a quantity of not less than 0.0% nor more than about 6% by weight of the sheet-like acoustic window. The resin is employed in the practice of the invention at a temperature below its softening point, if a non-thermosetting resin.

Preferably the fibre reinforcement is a polyvinyl alcohol, a polyaramid, or a polyester fibril or fiber.

The above and other features and advantages of the invention will become more apparent when considered in light of a description of a preferred embodiment of the invention and a drawing in the form of two figures which follow, together forming a part of the specification.

BEST EMBODIMENT OF THE INVENTION

Figure 1:
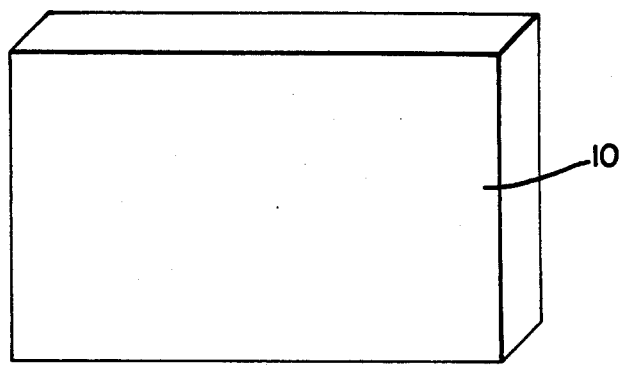
FIG. 1 is a prospective view of a sheet-like acoustic window made in accordance with the invention.

Referring to the drawing, FIG. 1 represents a sheet-like acoustic window 10 made in accordance with the invention. In FIG. 1, the acoustic window 10 is shown in a rectilinear sheet form but could equally be formed into a curvilinear or complexly surfaced curvilinear configuration. The sheet-like window is formed by molding, casting or other suitable or conventional forming techniques employed in forming elastomeric or rubber goods.

The window 10 is formed of an elastomeric material reinforced employing a fibre reinforcement. The material forming the window is preferably initially available as principally thermoset, thermoplastic or uncured material which is formed into a desired configuration.

By the term elastomer or elastomeric material, what is meant is a material, such as a rubber or plastic, which at room temperature can be stretched under low stress to at least twice its original length and, upon immediate release of the stress, will return with force to its approximate original length. The elastomer employed in the material forming the window of the instant invention is selected from a group consisting of natural, synthetic natural, chlorinated, and silicon rubbers; acrylonitrile-butadiene copolymers; styrene butadiene copolymers; polyurethane; and mixtures thereof. The selection of particular elastomers for use in the practice of the invention will be a function, in part, of the flexural moduli desired in a final, cured window 10. A flexural modulus of between about 2,000 to about 40,000 psi (13,790–275,800 kPa) is desired. The selection of a particular elastomer in part will also be a function of bulk properties desired in the cured window 10.

The desired bulk moduli properties include a longitudinal velocity propagation characteristic for an acoustic waveform being passed through the cured window 10 closely approximating that of the liquid medium or lower than that of the liquid medium in which the acoustic window 10 is immersed. As an illustration, where the medium liquid is water, the longitudinal velocity propagation characteristic desired in such a window 10 preferably is between about 1450 and 1700 meters per second.

Likewise, desirable flexural modulus for the material forming the window 10 would include a Young's modulus of between about 2000 psi and about 40,000 psi (13,790 kPa to 275,800 kPa). A static shear modulus associated with the material forming the window 10 is, in the final state, between about 660 psi and about 13,000 psi (4547 kPa and 89,570 kPa). The material forming the window, in a cured or final state, typically is possessed of an elongation to break of at least about 5%.

By the term Young's modulus as used herein, what is meant is a ratio of a simple tension stress applied to the material forming the window 10 (in the final state) to the resulting strain parallel to the tension. The Young's modulus is also a measure of the modulus of the elasticity for the material, which modulus of elasticity may also be known as the coefficient of elasticity, the elasticity modulus, or the elastic modulus.

By the term static shear modulus as used herein, what is meant is the modulus of elasticity in shear or a measure of the resistance to shearing stress inherent in the material forming the final window 10, equal to the shearing stress divided by the resultant angle of deformation expressed in radians. The static shear modulus may also be known as a coefficient of rigidity, a modulus of rigidity, or shear modulus.

Typically, the material forming the window 10 is a natural or synthetic natural rubber. The use of natural or synthetic natural rubber is much preferred in the practice of the invention, in part as a consequence of the relatively easy moldability of such rubbers. Alo in part, such rubbers are desirable from a standpoint of acoustic bulk properties. By synthetic natural rubbers, what is meant is a substantial proportion, at least half, of the rubber being formed from polyisoprene, and preferably cis-1,4-polyisoprene.

The selection of a particular elastomer for forming the window 10 of the invention is in part a matter of experimental trial and error to produce a cured final elastomer forming the window 10 as set forth herein having desired bulk acoustic properties and desired flexural moduli necessary for yielding desirable undersea performance characteristics.

Accordingly, the elastomer comprising the material forming the window 10 of the invention may include a filler. This filler is generally in a particulate form and does not necessarily provide a particular reinforcing characteristic to the material forming the window 10. Some such fillers may reinforce, however. This filler, which may be present in a quantity of between of about 0.0% and about 50% by weight of the material forming the window of the invention, preferably is present in a quantity of between of about 10% and about 30% by weight of the material forming the window 10. The filling agent typically is a particulate carbon black, and most particularly, KETJEN ® commercially available carbon black produces desirable results with natural or synthetic natural rubbers in quantities of between about 20 and about 40 parts per hundred weight of natural or synthetic natural rubbers employed in forming the window 10 of the invention.

Other elastomers finding utility in the practice of the invention include styrene butadiene and acrylonitrile based rubbers, the latter being commonly known in the industry as nitrile rubbers. Chlorinated rubbers such as NEOPRENE ® find utility in forming the window 10 of the invention as do polyurethanes. By the term rubber as used herein to modify the specifically identified species of rubber suitable for use in the practice of the invention, what is meant is a vulcanized, or cross-linked elastomer made according to suitable or conventional techniques. The use of a suitable or conventional curing agent or cross linking agent in effective quantity may be desirable depending upon the elastomer.

The fibre reinforcement is formed of fibers or fibrils. It is important that the fibers or fibrils forming the fibre reinforcement in the material employed in forming the window 10 of the invention not entrap and carry into the window 10 a significant quantity of air. The window 10, as formed and cured, must not contain more than 0.10% on a volume basis as air entrapped as a function of fiber or fibrils introduced into the material forming the window 10 during preparation of the material eventually forming the window. Applicants have found that where the fibers or fibrils present in the material eventually forming the window are generated from the source wherein these fibers or fibrils are bundled or otherwise closely associated such as by twisting, the opportunity for introducing undesirably elevated quantities of air into the window 10 is unacceptable. Fibers or fibrils in close association are typically found where the fibers or fibrils are other than a monofilament in nature or have been twisted as monofilaments, or deformed into bundles or threads of fibers such as might occur in preparing knit or woven fabric, cording, cable, mesh, screening or other structures. Additionally, it has been found that the outer surface of each fiber or fibril must be substantially smooth at a microscopic level thereby avoiding an opportunity for air to be trapped along microscopic protuberances associated with the surface of the fiber or fibril. For this reason, relatively "hairy" fibers or fibrils such as those associated with wool or cotton do not find ready utility in the practice of the invention.

Fibers or fibrils formed from steel, polyester, polyamide, polyaramid, polyimide, rayon, polyvinyl alcohols, nylon, and mixtures thereof when employed in a monofilament or unbundled state to form the fibre reinforcement in the window 10, provide entrapped air associated with the fibers or fibrils of less than 0.10%. Such fibers or fibrils have been found to be associated typically with an air entrapment of less than 0.05% on a volume basis and typically are associated with an air entrapment of less than 0.01% on a volume basis when used for the window 10 of the invention. Most preferred in the practice of the invention are polyvinyl alcohol fibers, polyaramid fibrils, and polyester fibers.

The fibers or fibrils are introduced as fibre reinforcement and typically comprised between about 5% and about 35% by weight of the elastomer forming the material of window 10. Most typically these fibers or fibrils comprise between about 5% and 20% by weight of the elastomer comprising the material of the window 10.

The fibers or fibrils are introduced as fibre reinforcement using suitable or conventional techniques such as by ordinary rubber mixing on a Banbury machine or the like. The fibers or fibrils typically are possessed of a denier of from 0.5 to 840 and lengths of from 0.1 millimeters to approximately 2.5 centimeters. The particular dimensions of the fibers or fibrils will, in part, be a function of the nature of the fibril or fiber itself, that is inherently associated with its manufacture, and also to certain extent be a function of a tendency for the fibrils to become inextricably intertwined, thereby promoting the formation of knots or tangles during handling or processing which knots or tangles could function to entrap air and thereby produce deleterious sonic opaqueness in any resulting window 10.

The use of fibers or fibrils for fibre reinforcement in accordance with the invention produces a window having desirable bulk properties of the matrix elastomer forming the window which deviate only to a negligible extent from the bulk properties of the pure elastomer itself. The extent of fibre loading in the material forming the window 10 is to a certain extent a function of desired flexural moduli in the window 10 following curing.

In order to enhance the flexural modulus and/or to improve processability of the window 10 formed in accordance with the invention, the material forming the window 10 may include a resin of thermosetting or non-thermosetting type. This resin is selected from a group consisting of phenol formaldehydes, octyl phenol formaldehydes, resorcinol formaldehydes, and coumarone indenes and mixtures thereof present in the material forming the window 10 in a quantity of not more than about 9% by weight of the elastomer in the material. Particularly preferred the practice of the invention is P-octyl phenol formaldehyde in a quantity of not less than about 2% and no more than about 6% by weight of the elastomeric material forming the window 10.

The fibres, the elastomer, any filler, and any resin are combined in suitable or conventional well-known rubber mixing techniques and may be formed by molding and subsequent curing including cross-linking curing or vulcanization to produce a desired window configuration 10.

Figure 2:
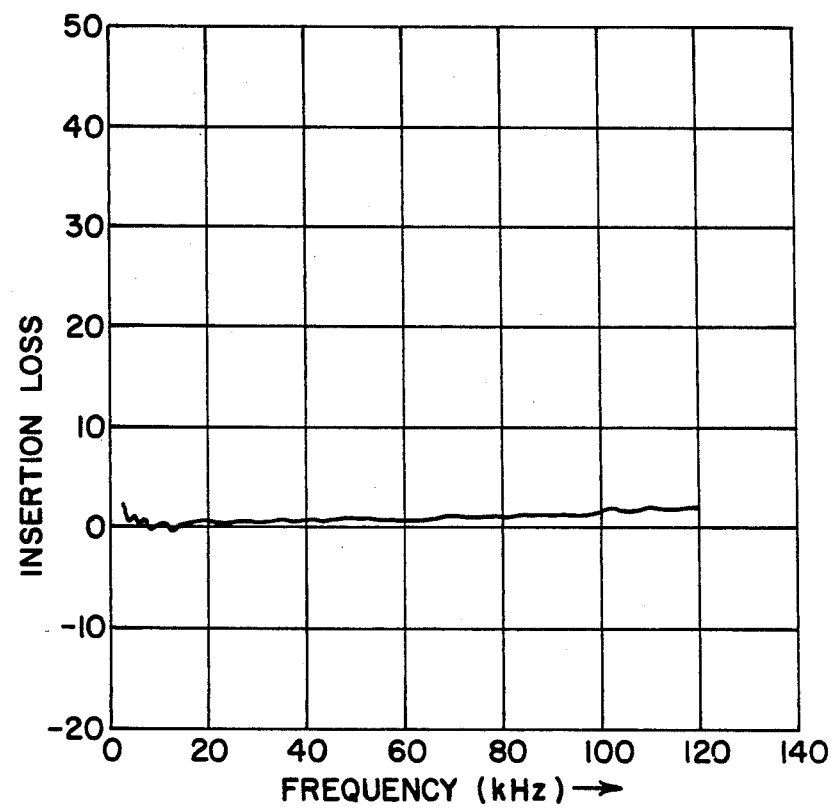
FIG. 2 is a graphical representation of insertion loss versus frequency.

Referring to the drawing, FIG. 2 is a graphical representation of insertion loss in decibels plotted on an axis versus frequency in kHz plotted on an abcissa (receive gate 0.2 ms, receive gate 0.5 ms, delay into pulse 0.1 ms)

for a sonic window at 6° C., 345 k pascals having a thickness of 1.4 centimeters, overall dimension of 76×76 centimeters and formed from a natural rubber elastomer, including fibre of poly vinyl alcohol present in a quantity of 26.81 grams per hundred weight elastomer, a filler of KETJEN ® black present in a quantity of 23.05 grams per hundred weight elastomer, and a P-octyl phenol formaldehyde resin present in a quantity of 4.61 grams per hundred weight elastomer. These components were formed into a material for a window 10 in accordance with the invention by Banbury mixing until uniform, molding at ≧800 psi (5512 kPa) for 50 minutes at 149° C. Waveform propagation through the resulting window was at approximately 1660 meters per second at 5° C.

The Banbury mix was begun at 120° F. (49° C.) by adding in order the natural rubber, the KETJEN ® black and the resin; mixing continued for 8½ minutes reaching a final temperature of 370° F. (187° C). The mix was dumped to a mill where the fibre reinforcement was added in conventional manner and thoroughly blended. The mill batch was then sheeted out into smooth thin plies. Referring to the drawings, FIG. 2 depicts particularly the desirable performance of a window 10 of the invention particularly in a range of frequencies from about 10 kHz to about 100 kHz.

It should be apparent that various modifications may be made to this preferred embodiment of the invention without departing from the scope of the claims that follow:

What is claimed is:

1. A sheet-like acoustic window having a frequency range from about 10 kHz to about 100 kHz comprising: an elastomer and a fibre reinforcement;
   the elastomer being selected from a group consisting of: natural, synthetic natural, chlorinated, and silicon rubbers; acrylonitrile-butadiene copolymer; styrene-butadiene copolymer; polyurethanes; and mixtures thereof, and further including a filler and a resin;
   the fibre reinforcement being selected from chopped fiber or fibrils of a material selected from a group consisting of: steel, polyester, polyamide, polyaramid, polyimide, rayon, polyvinyl alcohols, nylon and mixtures thereof and imparting to the sheet-like acoustic window entrapped air not in excess of 0.10% of the volume of the acoustic window;
   the fibre reinforcement, the elastomer, the filler and the resin being substantially uniformly and blendedly present in desired, effective proportions to provide a Young's modulus of between about 2000 psi and about 40,000 with the sheet-like acoustic window being formed and processed to possess desired physical dimensions and being of a configuration providing effective strength when employed as a sonic window.

2. The sheet-like acoustic window of claim 1, the entrapped air attributable to the fibre reinforcement being less that 0.05% by volume of the sheet-like acoustic window.

3. The sheet-like acoustic window of claim 2, the filler being a particulate present in a quantity of not more than 50% by weight of the elastomer present in the sheet-like acoustic window.

4. The sheet-like acoustic window of claim 3, the filler being a particulate carbon.

5. The sheet-like acoustic window of claim 2, the resin being selected from a group consisting of: phenol formaldehyde, octyl phenol formaldehyde, resorcinal formaldehyde, coumarone indene and mixtures thereof present in a quantity of not more than 9% by weight of elastomer comprising the sheet-like acoustic window.

6. The sheet-like acoustic window of claim 2, the fibre reinforcement being present in a quantity of not less than 5% nor more than 35% by weight of the elastomer comprising the sheet-like acoustic window.

7. The sheet-like acoustic window of claim 6, the fibre reinforcement being selected from a group consisting of polyvinyl alcohol, polyaramid, and polyester fibrils or fibers.

8. A sheet-like acoustic window having a frequency range from about 10 kHz to about 100 kHz comprising: an elastomer and a fibre reinforcement;
   the elastomer being selected from a group consisting of: natural, synthetic natural, chlorinated, and silicon rubbers; acrylonitrile-butadiene copolymer; styrene-butadiene copolymer; polyurethanes; and mixtures thereof, and further including a particulate filler and a resin, the particulate filler being present in the sheet-like acoustic window in a quantity of not more than 50% by weight of the elastomer comprising the sheet-like acoustic window, and the resin being present in the sheet-like acoustic window in a quantity of not more than 9% by weight of the elastomer comprising the sheet-like acoustic window;
   the fibre reinforcement being selected from chopped fiber or fibrils of a material selected from a group consisting of: steel, polyester, polyamide, polyaramid, polyimide, rayon, polyvinyl alcohols, nylon and mixtures thereof and imparting to the acoustic window entrapped air not in excess of 0.10% of the volume of the sheet-like acoustic window, the fibre reinforcement being present in the sheet-like acoustic window in a quantity of not less than 5% and not more than 35% by weight of the elastomer comprising the sheet-like acoustic window;
   the fibre reinforcement, the elastomer, the filler and the resin being substantially uniformly and blendedly present in desired, effective proportions to provide a Young's modulus of between about 2000 psi and about 40,000 with the sheet-like acoustic window being formed and processed to possess desired physical dimensions and being of a configuration providing effective strength when employed as a sonic window.

9. The sheet-like acoustic window of claim 8, the filler being a particulate carbon.

10. The sheet-like acoustic window of claim 8, the resin being selected from a group consisting of: phenol formaldehyde, octyl phenol formaldehyde, resorcinal formaldehyde and coumarone indene, and mixtures thereof.

11. The sheet-like acoustic window of claim 8, the fibre reinforcement being selected from a group consisting of polyvinyl alcohol, polyaramid, and polyester fibrils or fibers.

12. A material suitable for use in forming a sheet-like acoustic window having a frequency range from about 10 kHz to about 100 kHz comprising: an elastomer filler resin and a fibre reinforcement;
   the elastomer being selected from a group consisting of: natural, synthetic natural, chlorinated, and silicon rubbers; acrylonitrile-butadiene copolymer; styrene-butadiene copolymer; polyurethanes; and mixtures thereof, and further including particulate filler and a resin, the particulate filler being present in a quantity of not more than 50% by weight of the elastomer, and the resin being present in a quantity of not more than 9% by weight of the elastomer;

the fibre reinforcement being selected from chopped fiber or fibrils of a substance selected from a group consisting of: steel, polyester, polyamide, polyaramid, polyimide, rayon, polyvinyl alcohols, and nylon and imparting to the material entrapped air not in excess of 0.10% of the volume of the material, the fibre reinforcement being present in a quantity of not less than 5% and not more than 35% by weight of the elastomer;

the fibre reinforcement, the elastomer, the filler and the resin being substantially uniformly and blendedly present in desired, effective proportions to provide a Young's modulus of between about 2000 psi and about 40,000 and an elongation to break of at least about 5%.

13. The material of claim 12, entrapped air attributable to the fibre reinforcement being less than 0.05% by volume of the material.

14. The material of claim 13, the filler being a particulate carbon.

15. The material of claim 12, the resin being selected from a group consisting of: phenol formaldehyde, octyl phenol formaldehyde, resorcinal formaldehyde and coumarone indene and mixtures thereof.

16. The material of claim 12, the fibre reinforcement being selected from a group consisting of polyvinyl alcohol, polyaramid, and polyester fibrils or fibers.

17. The material of claim 13, the fibre reinforcement being selected from a group consisting of polyvinyl alcohol, polyaramid, and polyester fibrils or fibers.

18. The material of claim 14, the fibre reinforcement being selected from a group consisting of polyvinyl alcohol, polyaramid, and polyester fibrils or fibers.

19. The material of claim 15, the fibre reinforcement being selected from a group consisting of polyvinyl alcohol, polyaramid, and polyester fibrils or fibers.

* * * * *